United States Patent
Hernvall et al.

(10) Patent No.: US 11,748,460 B2
(45) Date of Patent: Sep. 5, 2023

(54) PROCEDURAL CODE GENERATION FOR CHALLENGE CODE

(71) Applicant: Imperva, Inc., San Mateo, CA (US)

(72) Inventors: Emil Hernvall, Vällingby (SE); Daniel Spång, Solna (SE)

(73) Assignee: Imperva, Inc., San Mateo, CA (US)

( * ) Notice: Subject to any disclaimer, the term of this patent is extended or adjusted under 35 U.S.C. 154(b) by 238 days.

(21) Appl. No.: 17/084,659

(22) Filed: Oct. 30, 2020

(65) Prior Publication Data

US 2021/0334342 A1 Oct. 28, 2021

Related U.S. Application Data

(60) Provisional application No. 62/704,207, filed on Apr. 27, 2020.

(51) Int. Cl.
| | |
|---|---|
| *H04L 9/40* | (2022.01) |
| *G06F 21/14* | (2013.01) |
| *G06F 8/40* | (2018.01) |
| *H04L 9/08* | (2006.01) |
| *G06F 9/455* | (2018.01) |

(52) U.S. Cl.
CPC ............... *G06F 21/14* (2013.01); *G06F 8/40* (2013.01); *G06F 9/4552* (2013.01); *H04L 9/0869* (2013.01); *H04L 63/1416* (2013.01); *G06F 2221/0724* (2013.01); *G06F 2221/2151* (2013.01); *H04L 2463/144* (2013.01)

(58) Field of Classification Search
CPC .......... G06F 21/14; G06F 8/40; G06F 9/4552; G06F 2221/0724; G06F 2221/2151; G06F 8/4443; H04L 9/0869; H04L 63/1416; H04L 2463/144; H04L 9/50; H04L 2209/16; H04L 9/3239
See application file for complete search history.

(56) References Cited

U.S. PATENT DOCUMENTS

| | | | |
|---|---|---|---|
| 7,426,721 B1 * | 9/2008 | Saulpaugh | H04L 67/51 |
| | | | 718/1 |
| 7,620,987 B2 * | 11/2009 | Shelest | G06F 21/52 |
| | | | 713/189 |

(Continued)

OTHER PUBLICATIONS

Lu et al., Automatic Simplification of Obfuscated JavaScript Code: A Semantics-Based Approach, IEEE, 2012.*

*Primary Examiner* — David Garcia Cervetti
(74) *Attorney, Agent, or Firm* — Nicholson, De Vos, Webster & Elliott, LLP

(57) ABSTRACT

A method by one or more computing devices for obfuscating challenge code. The method includes obtaining challenge code for interrogating a client, inserting, into the challenge code, code for obfuscating outputs that are to be generated by the client, where the code for obfuscating the outputs includes code for applying a first chain of reversible transformations to the outputs using client-generated random values, interning strings appearing in the challenge code with obfuscated strings, inserting code for deobfuscating the obfuscated strings into the challenge code, inlining function calls in the challenge code, removing function definitions that are unused in the challenge code due to the inlining, reordering the challenge code without changing the functionality of the challenge code, and providing the challenge code for execution by the client.

20 Claims, 7 Drawing Sheets

(56) References Cited

U.S. PATENT DOCUMENTS

| | | | | |
|---|---|---|---|---|
| 8,429,637 B2* | 4/2013 | Myles | G06F 21/14 | 712/208 |
| 8,621,606 B1* | 12/2013 | Ferrie | G06F 21/629 | 726/22 |
| 8,683,452 B1* | 3/2014 | Hodgman | G06F 8/51 | 717/136 |
| 8,806,187 B1* | 8/2014 | Vemula | H04L 67/306 | 713/150 |
| 8,806,627 B1* | 8/2014 | Aharoni | G06F 21/14 | 726/22 |
| 8,949,660 B1* | 2/2015 | Pupius | G06F 11/36 | 714/4.4 |
| 9,241,004 B1* | 1/2016 | April | G06F 40/117 | |
| 9,294,502 B1* | 3/2016 | Benishti | H04L 63/145 | |
| 9,420,049 B1* | 8/2016 | Talmor | H04L 63/0209 | |
| 9,438,625 B1* | 9/2016 | Yang | H04L 63/1441 | |
| 9,582,666 B1* | 2/2017 | Overson | G06F 21/572 | |
| 9,626,359 B1* | 4/2017 | Sun | G06F 21/125 | |
| 9,690,936 B1* | 6/2017 | Malik | G06F 21/566 | |
| 9,721,120 B2* | 8/2017 | McLachlan | G06F 21/629 | |
| 9,887,969 B1* | 2/2018 | Shemesh | H04L 63/168 | |
| 10,216,488 B1* | 2/2019 | Overson | H04L 63/0281 | |
| 10,270,792 B1* | 4/2019 | Shemesh | H04L 63/1433 | |
| 10,511,628 B1* | 12/2019 | Richards | H04L 63/1483 | |
| 10,574,642 B2* | 2/2020 | Bianchini | H04L 63/10 | |
| 10,721,269 B1* | 7/2020 | Talmor | H04L 67/02 | |
| 10,878,086 B2* | 12/2020 | Yi | G06F 21/54 | |
| 10,956,477 B1* | 3/2021 | Fang | G06F 40/30 | |
| 11,019,096 B2* | 5/2021 | Takata | H04L 63/145 | |
| 11,374,945 B1* | 6/2022 | Senecal | H04L 63/1466 | |
| 11,436,305 B2* | 9/2022 | Liu | G06F 21/14 | |
| 2004/0003278 A1* | 1/2004 | Chen | G06F 21/14 | 726/21 |
| 2007/0039048 A1* | 2/2007 | Shelest | G06F 21/566 | 726/22 |
| 2009/0165131 A1* | 6/2009 | Treadwell | G06F 21/52 | 726/22 |
| 2011/0179403 A1* | 7/2011 | Lerouge | G06F 21/14 | 717/141 |
| 2011/0277037 A1* | 11/2011 | Burke | G06F 21/60 | 726/26 |
| 2012/0090030 A1* | 4/2012 | Rapaport | H04L 63/1441 | 726/23 |
| 2012/0159621 A1* | 6/2012 | Jeong | G06F 21/51 | 726/22 |
| 2013/0160120 A1* | 6/2013 | Malaviya | G06F 21/552 | 726/23 |
| 2014/0109201 A1* | 4/2014 | Israel | H04L 63/0876 | 726/5 |
| 2014/0181976 A1* | 6/2014 | Snow | G06F 21/554 | 726/23 |
| 2014/0282417 A1* | 9/2014 | Paveza | G06F 11/3664 | 717/124 |
| 2014/0289535 A1* | 9/2014 | Gan | G06F 21/53 | 713/189 |
| 2014/0338000 A1* | 11/2014 | Newman | G06F 21/62 | 726/27 |
| 2014/0344569 A1* | 11/2014 | Li | G06F 21/128 | 726/26 |
| 2015/0033016 A1* | 1/2015 | Thornton | H04L 9/0869 | 713/171 |
| 2015/0154407 A1* | 6/2015 | Yi | G06F 21/14 | 713/194 |
| 2015/0295945 A1* | 10/2015 | Canzanese, Jr. | G06F 21/55 | 726/23 |
| 2015/0363598 A1* | 12/2015 | Xu | G06F 21/563 | 726/23 |
| 2016/0119304 A1* | 4/2016 | Lelcuk | G06F 21/62 | 726/3 |
| 2016/0119344 A1* | 4/2016 | Freitas Fortuna dos Santos | H04L 63/1466 | 726/7 |
| 2016/0132667 A1* | 5/2016 | Freitas Fortuna dos Santos | G06F 21/125 | 713/189 |
| 2016/0142438 A1* | 5/2016 | Pastore | H04L 63/1416 | 726/4 |
| 2016/0180096 A1* | 6/2016 | Sharma | G06F 21/577 | 726/25 |
| 2016/0212153 A1* | 7/2016 | Livshits | G06F 21/56 | |
| 2016/0277429 A1* | 9/2016 | Demirjian | G06F 21/36 | |
| 2016/0359875 A1* | 12/2016 | Kim | G06F 21/566 | |
| 2016/0359904 A1* | 12/2016 | Ben Ezra | H04L 63/10 | |
| 2017/0054554 A1* | 2/2017 | Park | H04L 9/088 | |
| 2017/0063923 A1* | 3/2017 | Yang | G06F 21/54 | |
| 2017/0070534 A1* | 3/2017 | Bailey | G06F 21/602 | |
| 2017/0083486 A1* | 3/2017 | van der Horst | H04L 63/0281 | |
| 2017/0171170 A1* | 6/2017 | Sun | H04L 9/088 | |
| 2017/0244713 A1* | 8/2017 | Sun | G06F 21/125 | |
| 2017/0257383 A1* | 9/2017 | Ficarra | H04L 63/08 | |
| 2017/0257385 A1* | 9/2017 | Overson | H04L 63/1416 | |
| 2017/0264623 A1* | 9/2017 | Ficarra | G06F 9/455 | |
| 2017/0351847 A1* | 12/2017 | Zvenigorodsky | G06F 8/423 | |
| 2018/0012144 A1* | 1/2018 | Ding | H04L 63/1408 | |
| 2018/0081826 A1* | 3/2018 | Gounares | G06F 21/14 | |
| 2018/0121680 A1* | 5/2018 | Wang | G06F 21/64 | |
| 2018/0159830 A1* | 6/2018 | Gibbons | G06F 9/45529 | |
| 2018/0198807 A1* | 7/2018 | Johns | H04L 63/1425 | |
| 2018/0241760 A1* | 8/2018 | Stephens | H04L 63/0428 | |
| 2018/0302437 A1* | 10/2018 | Pastore | H04L 63/1466 | |
| 2019/0052651 A1* | 2/2019 | Cheetancheri | H04L 63/0245 | |
| 2019/0065712 A1* | 2/2019 | Deutschmann | H04L 63/0807 | |
| 2019/0087574 A1* | 3/2019 | Schmidtler | H04L 63/1408 | |
| 2019/0132355 A1* | 5/2019 | Egbert | H04L 63/1466 | |
| 2019/0180036 A1* | 6/2019 | Shukla | G06F 9/542 | |
| 2019/0238524 A1* | 8/2019 | Copty | H04L 63/08 | |
| 2019/0258473 A1* | 8/2019 | Vishnepolsky | H04L 67/02 | |
| 2019/0332747 A1* | 10/2019 | Raman | H04L 63/1425 | |
| 2019/0371209 A1* | 12/2019 | Gounares | G06F 8/52 | |
| 2020/0210584 A1* | 7/2020 | Ficarra | G06F 21/54 | |
| 2020/0233962 A1* | 7/2020 | Chantry | G06F 21/563 | |
| 2020/0342100 A1* | 10/2020 | Goldstein | G06F 21/52 | |
| 2020/0412740 A1* | 12/2020 | Goutal | H04L 63/1483 | |
| 2021/0006591 A1* | 1/2021 | Akuka | H04L 63/1416 | |
| 2021/0034719 A1* | 2/2021 | Brown | G06F 21/14 | |
| 2021/0097083 A1* | 4/2021 | Harris | G06F 21/53 | |
| 2021/0097174 A1* | 4/2021 | Mandal | G06F 21/554 | |
| 2021/0097202 A1* | 4/2021 | Datta | G06F 21/602 | |

* cited by examiner

SYMBOLIC REPRESENTATION OF CODE 210

```
(defun print_name (name)
  ((. window "console" "log") (+ "Hello " name))
)

(define names (array "Emil" "Hannes" "Lia"))
(for name names
  (print_name name)
)
```

JAVASCRIPT CODE 220

```
function print_name(name) {
    return window.console.log("Hello " + name);
}
var names = ["Emil", "Hannes", "Lia"];
for (let name of names) {
    print_name(name);
}
```

Figure 2

JAVASCRIPT CODE WITH INTERNING 310

```
// functions omitted for brevity
var encoded_chunk_0 = "dvbGxpbWDdW5uYWhAL2xsZWhBawxFbG9jfm9jY=";

var decoded_chunk_0 = string_from_ascii_bytes(swap_nibbles(reverse(base64_decode_to_bytes(encoded_chunk_0))));

function print_name(name) {
    return global[decoded_chunk_0.substr(0, 7)][decoded_chunk_0.substr(26, 3)](decoded_chunk_0.substr(10, 6) + name);
} var names =
[decoded_chunk_0.substr(22, 4), decoded_chunk_0.substr(16, 6), decoded_chunk_0.substr(7, 3)];

for (let name of names) {
    print_name(name);
}
```

Figure 3

JAVASCRIPT CODE WITH INTERNING AND INLINING 410

```
var binary_str4353 = global.atob(encoded_chunk_04352);
var n4354 = binary_str4353.length;
var bytes4355 = [];
var i4356 = 0;
while (i4356 < n4354) {
    var byte4357 = binary_str4353.charCodeAt(i4356);
    bytes4355.push(byte4357);
    i4356 += 1;
}
var return_expr4358 = bytes4355;
var bytes_len4359 = return_expr4358.length;
var key_length4360 =
    [10, 104, 164, 193, 213, 181, 33, 57, 116, 135, 195, 8, 215, 166, 143,
28, 91, 34, 43, 79, 115, 73, 25, 156, 31, 143, 184, 117, 100, 175].length;
var result4361 = [];
var i4362 = 0;
while (i4362 < bytes_len4359) {
    var byte4363 = return_expr4358[i4362];
    var k4364 =
        [10, 104, 164, 193, 213, 181, 33, 57, 116, 135, 195, 8, 215, 166,
143, 28, 91, 34, 43, 79, 115, 73, 25, 156, 31, 143, 184, 117, 100,
175][i4362
    %
    key_length4360];
    result4361.push(byte4363 ^ k4364);
    i4362 += 1;
}
var return_expr4365 = result4361;
var bytes_len4366 = return_expr4365.length;
var key_length4367 =
    [152, 93, 39, 57, 17, 230, 195, 59, 155, 130, 31, 116, 116, 43, 100,
131, 232, 19, 241, 182, 21, 102].length;
var result4368 = [];
var i4369 = 0;
while (i4369 < bytes_len4366) {
    var byte4370 = return_expr4365[i4369];
    var k4371 =
        [152, 93, 39, 57, 17, 230, 195, 59, 155, 130, 31, 116, 116, 43, 100,
131, 232, 19, 241, 182, 21, 102][i4369
    %
    key_length4367];
    result4368.push(byte4370 ^ k4371);
    i4369 += 1;
}
var return_expr4372 = result4368;

var encoded_chunk_04352 = "8UbmlqoyqmOGSfwTz+GO19RetpUPQsSkVNna/cg=";
var n4373 = return_expr4372.length;
var result4374 = [];
var i4375 = n4373 - 1;
while (i4375 >= 0) {
    result4374.push(return_expr4372[i4375]);
    i4375 -= 1;
}
var return_expr4376 = result4374;
var n4377 = return_expr4376.length;
var count_mod_n4378 = 126 % n4377;
var result4379 = [];
var i4380 = 0;
while (i4380 < n4377) {
    result4379.push(return_expr4376[(i4380 + n4377 - count_mod_n4378) %
n4377]);
    i4380 += 1;
}
var return_expr4381 = result4379;
var n4382 = return_expr4381.length;
var buffer4383 = [];
var i4384 = 0;
while (i4384 < n4382) {
    var ascii_byte4385 = return_expr4381[i4384];
    var char4386 = global.String.fromCharCode(ascii_byte4385);
    buffer4383.push(char4386);
    i4384 += 1;
}
var return_expr4387 = buffer4383.join("");
var decoded_chunk_04388 = return_expr4387;

var names4391 = [decoded_chunk_04388.substr(16, 4),
decoded_chunk_04388.substr(3, 6), decoded_chunk_04388.substr(0, 3)];
for (let name4392 of names4391) {
    var return_expr4393 =
        global[decoded_chunk_04388.substr(9,
7)][decoded_chunk_04388.substr(20, 3)](decoded_chunk_04388.substr(23, 6)
        +
        name4392);
    return_expr4393;
}
```

Figure 4

SYMBOLIC REPRESENTATION OF CODE WITH OUTPUT ANNOTATION 510

```
(define client_seed 1337)

(defun print_name (name)
  ((. window "console" "log") (#obfuscate arbitrary_label client_seed (+ "Hello " name)))
)

(define names (array "Emil" "Hannes" "Lia"))
(for name names
  (print_name name)
)
```

JAVASCRIPT CODE WITH OUTPUT OBFUSCATION 520

```
var client_seed = 1337;

function print_name(name) {
  var random_bytes_array = random_bytes(1138435175, client_seed, 2);
  return
    global.console.log(base64_encode_bytes(swap_neighbors(rotate_left(swap_neighbors(reverse(bytes_from_anything("Hello " + name))), random_bytes_array[0])));
} var names = ["Emil", "Hannes", "Lia"];
for (let name of names) {
  print_name(name);
}
```

Figure 5

PROCEDURAL CODE GENERATION FOR CHALLENGE CODE

CROSS-REFERENCE TO RELATED APPLICATIONS

This application claims the benefit of U.S. Provisional Application No. 62/704,207, filed Apr. 27, 2020, which is hereby incorporated by reference.

TECHNICAL FIELD

This disclosure relates to computer network security, and in particular to obfuscating challenge code.

BACKGROUND

Automated web traffic is prevalent on the internet. The bots that generate this traffic come from a wide variety of sources, from harmless web crawlers to malicious hackers targeting government voter registration pages. It has been found that almost forty percent of collected internet traffic is generated by bots.

One way to protect websites, applications, and application programming interfaces (APIs) from malicious bots is to send a challenge code (e.g., JavaScript code) to the client to interrogate the client for information. The interrogation results can be sent to a bot detection server, which analyzes the results to determine whether the client is operated by a malicious bot. The information that is collected during the interrogation is carefully chosen such that it varies between distinct clients. The interrogation results are also used to generate a fingerprint which is expected to be the same even if the client's cookies are cleared and the client acquires a new token. If the client successfully completes the challenge, the client is given a token which is set as a cookie. To prevent the same interrogation results from being submitted several times, a proof of work is used to compute a value which can be verified and stored on the server.

The interrogation results are typically sent as plain text (e.g., in JavaScript Object Notation (JSON) format) so it is trivial for attackers to use a network panel to see what is being interrogated. This makes it relatively easy for attackers to manipulate the client and/or the interrogation results until they can see that they are no longer being blocked. The proof of work scheme is distinct from the interrogation so once an attacker takes the challenge code apart and understands how to generate valid proofs, the attacker can freely manipulate the interrogation results.

BRIEF DESCRIPTION OF THE DRAWINGS

The invention may best be understood by referring to the following description and accompanying drawings that are used to illustrate embodiments of the invention. In the drawings:

FIG. 2 is a diagram illustrating a symbolic representation of code and a corresponding JavaScript code, according to some embodiments.

FIG. 3 is a diagram illustrating JavaScript code with interning, according to some embodiments.

FIG. 4 is a diagram illustrating JavaScript code with interning and inlining, according to some embodiments.

FIG. 5 is a diagram illustrating a symbolic representation of code with output annotation and a corresponding JavaScript code with output obfuscation, according to some embodiments.

DETAILED DESCRIPTION

Figure 1:
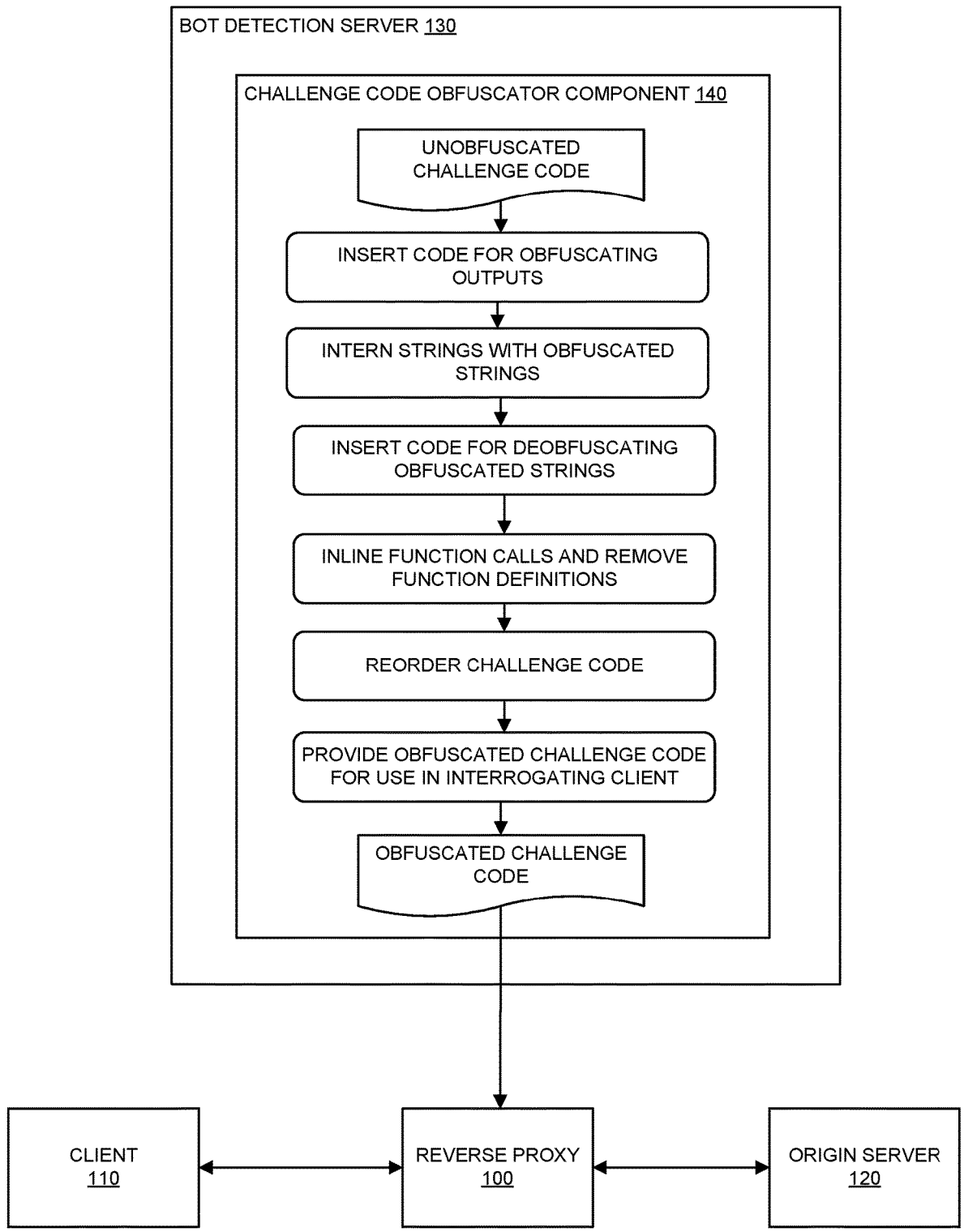
FIG. 1 is a block diagram of a system in which challenge code can be obfuscated, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and embodiments/claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As used herein, server end stations are network devices operable to execute or otherwise implement one or more servers providing content or services to clients. For example, server end stations may implement web application servers, application programming interface (API) servers, database servers, file servers, print servers, mail servers, gaming servers, application servers, and/or Domain Name System (DNS) servers.

As used herein, client end stations (e.g., workstations, laptops, netbooks, palm tops, mobile phones, smartphones, multimedia phones, Voice over Internet Protocol (VoIP) phones, user equipment (UE), terminals, portable media players, Global Positioning Satellite (GPS) units, gaming systems, set-top boxes) are network devices operable to execute or otherwise implement applications that, among other functions, can access the content and/or services provided by servers over a network (e.g., over a local area network (LAN), over the Internet, and/or over virtual private networks (VPNs) overlaid on (e.g., tunneled through) the Internet).

As mentioned above, challenge code can be sent to the client for interrogating the client for information. The interrogation results can be sent to a bot detection server, which analyzes the interrogation results to determine whether the client is operated by a malicious bot. However, the interrogation results are typically sent as plain text (e.g., in JavaScript Object Notation (JSON) formst) so it is trivial for attackers to use a network panel to see what is being interrogated. This makes it relatively easy for attackers to manipulate the client and/or the interrogation results until they can see that they are no longer being blocked. The proof of work scheme is distinct from the interrogation so once an attacker takes the challenge code apart and understands how to generate valid proofs, the attacker can freely manipulate the interrogation results, which makes it just a matter of time before the attacker is able to get past the bot detection mechanism.

Embodiments described herein improve the security of the bot detection mechanism by using procedural code generation techniques to obfuscate challenge code and outputs (e.g., interrogation results) that are sent to the bot detection server. The use of procedural code generation techniques may allow the challenge code to be obfuscated differently each time it is generated depending on the seed used to obfuscate the challenge code, and also allow the outputs that are sent to the bot detection server to be obfuscated differently each time the outputs are sent even if the content of the outputs and the underlying challenge code is the same. An advantage of embodiments described herein is that they improve the security of the bot detection mechanism by making it more difficult for an attacker to understand the challenge code itself and the outputs that are sent to the bot detection server.

An embodiment is a method by one or more computing devices for obfuscating challenge code. The method includes obtaining challenge code for interrogating a client, inserting, into the challenge code, code for obfuscating outputs that are to be generated by the client, where the code for obfuscating the outputs includes code for applying a first chain of reversible transformations to the outputs using client-generated random values, interning strings appearing in the challenge code with obfuscated strings, inserting code for deobfuscating the obfuscated strings into the challenge code, inlining function calls in the challenge code, removing function definitions that are unused in the challenge code due to the inlining, reordering the challenge code without changing the functionality of the challenge code, and providing the challenge code for execution by the client. Various embodiments are further described with reference to the accompanying figures.

FIG. 1 is a block diagram of a system in which challenge code can be obfuscated, according to some embodiments. As shown in the diagram, the system includes a client 110, an origin server 120, and a reverse proxy 100 that is communicatively coupled between the client 110 and the origin server 120. The client 110 may access a resource/service (e.g., a web application or application programming interface (API)) hosted by the origin server 120, for example, by generating one or more web application layer requests (e.g., HTTP request messages such as a "POST" HTTP request messages or "GET" HTTP request messages) and sending these web application layer requests to the origin server 120. In response to receiving web application layer requests, the origin server 120 may send corresponding web application layer responses (e.g., HTTP response messages) containing data/content to the client 110. The client 110 may render the data/contents of the web application layer responses (e.g., on a display screen for an end user) or otherwise consume the data/contents of the web application layer responses. The client 110 may be implemented using one or more client end station and the origin server 120 may be implemented using one or more server end stations. In one embodiment, the client 110 is a web browser and the origin server 120 is a web server. While for the sake of simplicity the diagram shows a single client 110 and a single origin server 120, it should be understood that most practical implementations will have more than one client 110 accessing possibly more than one origin server 120.

The reverse proxy 100 is a proxy that retrieves resources on behalf of the client 110 from the origin server 120. The reverse proxy 100 may sit inline to the communication path between the client 110 and the origin server 120 such that it can see the traffic being sent to the origin server 120 (and possibly see traffic being sent in the other direction by the origin server 120 to clients). In one embodiment, the reverse proxy 100 is deployed "in front" of the origin server 120 to protect the origin server 120 from attacks by clients. For example, the reverse proxy 100 may intercept all traffic being sent to the origin server 120 and apply security rules to the traffic to block/filter any traffic that is deemed to be malicious. In one embodiment, the reverse proxy 100 implements a web application firewall, a content delivery network (CDN) proxy, and/or a load balancer. The reverse proxy 100 may be implemented using one or more network devices.

As shown in the diagram, the reverse proxy 100 is also communicatively coupled to a bot detection server 130. The reverse proxy 100 may consult the bot detection server 130 to determine whether a client sending a request to the origin server 120 is operated by a malicious bot. For example, when the reverse proxy 100 intercepts the client's request, the reverse proxy 100 may send an analysis request to the bot detection server 130 to analyze whether a client 110 is operated by a malicious bot. The analysis request may include the client's request (or a portion thereof), information regarding the client 110 (e.g., the client's Internet Protocol (IP) address), and/or other information that may help the bot detection server 130 determine whether the client 110 is operated by a malicious bot. In response to receiving the analysis request, the bot detection server 130 may analyze the information included in the analysis request to determine whether the client 110 is operated by a malicious bot and send a response to the reverse proxy 100 indicating a suggested action. For example, the bot detection server 130 may send a response to the reverse proxy 100 indicating that the client 110 should be allowed to access the origin server 120 if the bot detection server 130 determines that the client is not operated by a malicious bot (e.g., it is operated by a human user) but may send a response to the reverse proxy 100 indicating that the client 110 should not be allowed to access the origin server 120 (i.e., blocked) if the bot detection server 130 determines that the client 110 is operated by a malicious bot. In some cases, the bot detection server 130 may send a response to the reverse proxy 100 indicating that the client needs to be identified. This could be because this is the first time that the bot detection server 130 has seen the client 110 or the client's token has expired. In such cases, challenge code may be sent to the client 110 to be executed by the client 110. The challenge code may include code for interrogating the client (e.g., to obtain various information about the client 110 that will help the bot detection server 130 determine whether the client 110 is operated by a malicious bot or not) and sending the interrogation results to the bot detection server 130 for analysis. If the bot detection server 130 determines that the client 110 is not operated by a malicious bot, then the bot detection server 130 may generate and provide a token for the client 110 that the client 110 can use to access the origin server 120.

The bot detection server 130 may be implemented using one or more network devices. While the bot detection server 130 is shown in the diagram as being implemented separately from the reverse proxy 100, in some embodiments the reverse proxy 100 and the bot detection server 130 are implemented together (e.g., bot detection features are built-in to the reverse proxy 100). In one embodiment, the bot detection server 130 is owned/operated by an entity that is different from the entity that owns/operates the origin server 120 and/or the reverse proxy 100. For example, the entity that owns/operates the bot detection server 130 may provide bot detection services to the entity that owns/operates the origin server 120 and/or the reverse proxy 100. In this sense, the entity that owns/operates the origin server 120 and/or the reverse proxy 100 may be a customer of the entity that owns/operates the bot detection server 130.

As shown in the diagram, the bot detection server 130 includes a challenge code obfuscator component 140. As will be described in additional detail below, the challenge code obfuscator component 140 may use procedural code generation techniques to obfuscate challenge code and also obfuscate outputs (e.g., interrogation results) that are to be sent by the client 110 to the bot detection server 130 as a result of the client 110 executing the challenge code. The outputs may be obfuscated such that they are opaque to observers but are understandable to the bot detection server 130.

For example, as shown in the diagram, the challenge code obfuscator component 140 may obtain unobfuscated challenge code (e.g., JavaScript code) and insert code into the challenge code for obfuscating outputs that are to be generated by the client 110. The code for obfuscating the outputs may include code for applying a chain of reversible transformations (e.g., transformations that can be reversed easily/trivially) to the outputs using client-generated random values. Examples of reversible transformations include string reversal, interspersion of random characters in predefined locations, XOR encryption, and nibble swapping. The challenge code obfuscator component 140 may determine the structure of the chain of reversible transformations (e.g., which reversible transformation to apply and/or the order in which to apply reversible transformations) using a timestamp and a random (or pseudo-random) seed that is generated by the challenge code obfuscator component 140. The client-generated random values may be determined using a client-generated random seed. In one embodiment, the challenge code obfuscator component 140 inserts code into the challenge code to generate the client-generated random values using a client-generated random seed and code for sending the client-generated random seed to the bot detection server 130. Knowing the client-generated random seed may allow the bot detection server 130 to deobfuscate the outputs when the bot detection server 130 receives the obfuscated outputs from the client 110 (e.g., it allows the bot detection server 130 to determine the client-generated random values used by the client 110 during obfuscation).

The challenge code obfuscator component 140 may then intern strings appearing in the challenge code with obfuscated strings (e.g., in JavaScript property access and method calls can be expressed as indexing the object using a string constant so these string constants can be interned with obfuscated strings). The challenge code obfuscator component 140 may generate the obfuscated strings by applying a chain of reversible transformations to the strings appearing in the challenge code. The challenge code obfuscator component 140 may determine the structure of the chain of reversible transformations (e.g., which reversible transformation to apply and the order in which to apply those reversible transformations) using a timestamp and a random (or pseudo-random) seed generated by the challenge code obfuscator component 140. It should be noted that this chain of reversible transformations may be the same or different from the chain of reversible transformations that is to be applied to the outputs.

The challenge code obfuscator component 140 may then insert code for deobfuscating the obfuscated strings into the challenge code. The code for deobfuscating the obfuscated strings may include code for applying the chain of reversible transformations (that was used to obfuscate the strings) in reverse order. For example, if the challenge code obfuscator component 140 obfuscates strings appearing in the challenge code by applying a chain of reversible transformations that includes string reversal followed by nibble swapping, then the code for deobfuscating the obfuscated strings may include code for applying nibble swapping followed by string reversal.

The challenge code obfuscator component 140 may then inline function calls in the challenge code. The challenge code obfuscator component 140 may inline function calls by replacing function calls appearing in the challenge code with the body of the function itself (with any function arguments being substituted).

The challenge code obfuscator component 140 may then remove function definitions that are unused in the challenge code due to the inlining. If function calls are inlined then the function definitions may not be needed and thus can be removed from the challenge code. Inlining function calls and removing the function definitions removes the existing abstractions/modularizations in the challenge code so as to make it more difficult to understand by an observer.

The challenge code obfuscator component 140 may then reorder the challenge code without changing the functionality of the challenge code. The reordering may further entangle unrelated parts of the challenge code (e.g., entangle the interrogation code from the proof of work code) to make it even more difficult to understand by an observer. In this manner, the challenge code obfuscator component 140 may generate obfuscated challenge code.

The challenge code obfuscator component 140 may then provide the obfuscated challenge code for execution by the client. For example, the challenge code obfuscator component 140 may send the obfuscated challenge code to the client 110 (e.g., via the reverse proxy 100). The client 110 may then execute the challenge code, which may cause the client 110 to perform an interrogation and send obfuscated outputs (e.g., interrogation results) to the bot detection server 130 (e.g., via the reverse proxy 100).

In one embodiment, the bot detection server 130 uses the procedural code generation techniques described above or similar techniques to periodically generate new challenge codes (e.g., every five minutes), where each of the challenge codes have the same functionality but are obfuscated differently (e.g., both in terms of how the strings appearing in the code are obfuscated and how the outputs are obfuscated). The challenge codes can be dated (e.g., using the timestamp that was used to determine the chain of reversible transformations) and expired after a certain period of time so that even if an attacker is able to deobfuscate the obfuscated challenge code they cannot use that challenge code after it expires (this gives the attacker only a certain window of time to be able to deobfuscate the obfuscated challenge code).

In one embodiment, the challenge code obfuscator component 140 uses a symbolic representation of the challenge code to procedurally generate the challenge code. The symbolic representation of the challenge code may be written in a language that custom-created for purposes of generating the challenge code. In one embodiment, the custom language is a minimal Lisp dialect that transpiles to JavaScript. The custom language may only include features that are needed for procedural code generation purposes, which makes it easy to work with.

While the challenge code obfuscator component 140 is shown in the diagram as being implemented as part of the bot detection server 130, it should be understood that the challenge code obfuscator component 140 can be implemented elsewhere (e.g., as part of the reverse proxy 100 or in the cloud).

FIG. 2 is a diagram illustrating a symbolic representation of code and a corresponding JavaScript code, according to some embodiments. The symbolic representation of code 210 shown in the diagram is written in a language that is custom-created for procedural code generation purposes. In the example shown in the diagram, the symbolic representation of code 210 defines a function called "print_name" that prints/outputs an array of names. The symbolic representation of code 210 also defines an array called "names" that includes the names "Emil," "Hannes," and "Lia." The symbolic representation of code 210 also includes code for printing/outputting the names included in the "names" array using the "print_name" function. The challenge code obfuscator component 140 may transpile the symbolic representation of code 210 to corresponding JavaScript code 220.

The JavaScript code 220 defines a function called "print_name" that prints/outputs an array of names, defines an array called "names" that includes the names "Emil," "Hannes," and "Lia," and includes code for printing/outputting the names included in the "names" array using the "print_name" function. For ease of understanding, code for printing/outputting an array of names is used as an example. It should be understood, however, that the symbolic representation of code 210 can be written to represent challenge code functionality and that it can be transpiled to a corresponding JavaScript in a similar manner.

FIG. 3 is a diagram illustrating JavaScript code with interning, according to some embodiments. The challenge code obfuscator component 140 may generate JavaScript code 310 by interning strings appearing in the JavaScript code 220. In this example, the various strings appearing in the JavaScript code 220 (e.g., "console," "log," "Hello," "Emil," "Hannes," and "Lia") are now interned with obfuscated strings. The challenge code obfuscator component may obfuscate the strings appearing in the JavaScript code 220 by concatenating the strings together and applying a chain of reversible transformations to the concatenated string to generate an encoded/obfuscated string ("encoded_chunk_0"). The challenge code obfuscator component 140 may determine the structure of the chain of reversible transformations using a timestamp and a random seed. In this example, the chain of reversible transformations includes a nibble swap followed by a string reversal. The JavaScript code with interning 310 also includes code for applying the chain of reversible transformations to the encoded string in reverse order (e.g., by applying a nibble swap followed by a string reversal) to generate a decoded string ("decoded_chunk_0"). The original strings can be extracted from the decoded string using a substring ("substr") function. It would be fairly easy for an observer to understand what is happening in this JavaScript code with interning 310. However, as shown in FIG. 4, interning can be combined with inlining to generate code that is difficult to understand by an observer.

FIG. 4 is a diagram illustrating JavaScript code with interning and inlining, according to some embodiments. The challenge code obfuscator component 140 may generate the JavaScript code with interning and inlining 410 by interning strings appearing in the JavaScript code 220 (e.g., as shown in FIG. 3) and also inlining function calls appearing in the JavaScript code 220 (and removing function definitions that are unused due to the inlining) As shown in the diagram, the combination of interning and inlining generates code that is very difficult to understand by an observer.

FIG. 5 is a diagram illustrating a symbolic representation of code with output annotation and a corresponding JavaScript code with output obfuscation, according to some embodiments. The symbolic representation of code with output annotation 510 represents similar underlying functionality as the symbolic representation of code 210 described above except that it includes a "#obfuscate" annotation to indicate the output that is to be obfuscated. The challenge code obfuscator component 140 may transpile the symbolic representation of code with output annotation 510 to the JavaScript code with output obfuscation 520.

The JavaScript code with output obfuscation 520 is similar to the JavaScript code 220 in functionality except that it includes code for obfuscating the output. In this example, the code for obfuscating the output includes code for applying a string reversal followed by a neighbor swap followed by a left rotation, followed by another neighbor swap. The JavaScript code with output obfuscation 520 also includes code for generating random bytes using a client seed and a timestamp. The client-generated random bytes can be used as inputs to the reversible transformations (e.g., a random byte is used as input to the "rotate_left" function to indicate the rotation amount).

Figure 6:
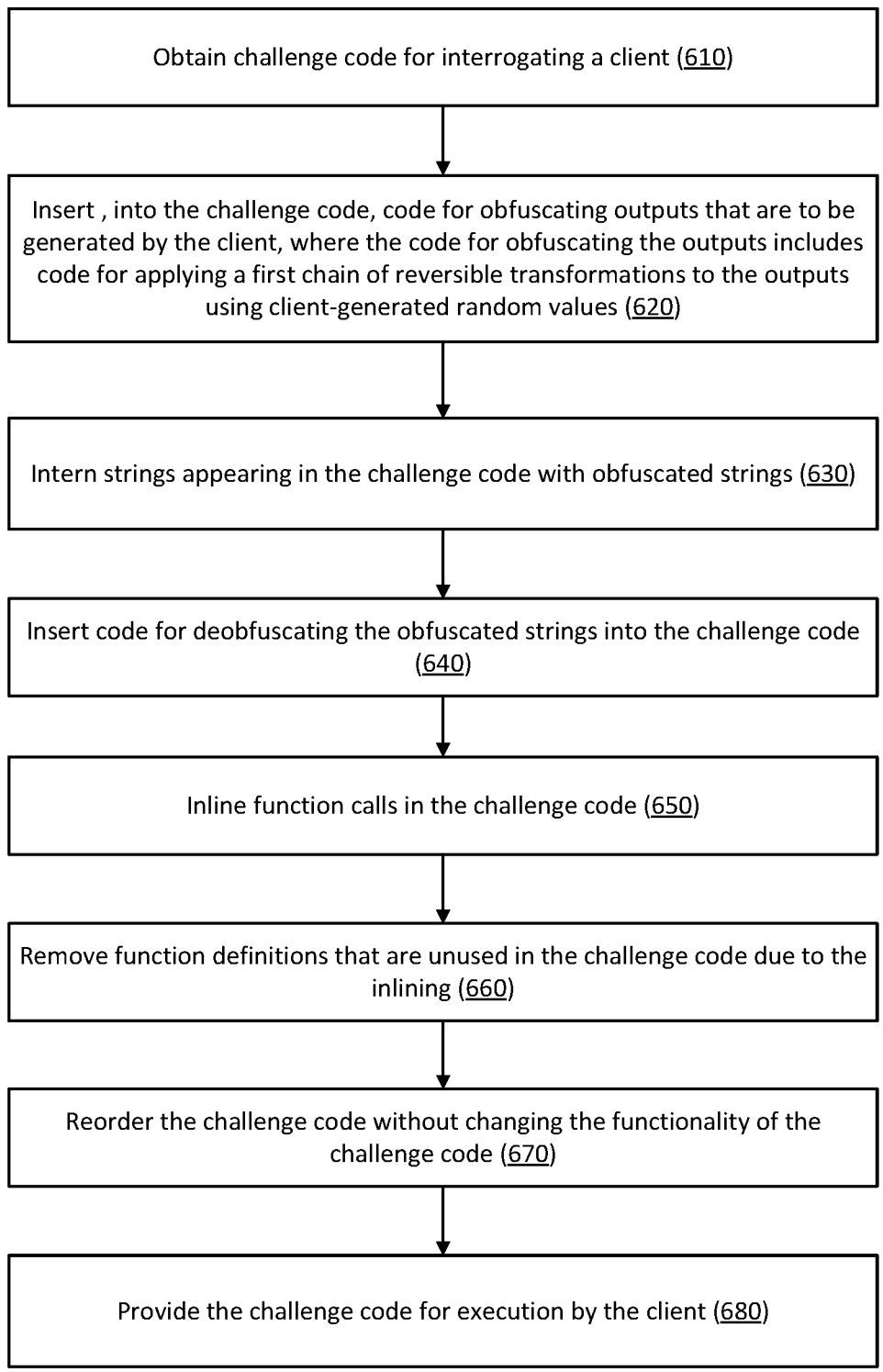
FIG. 6 is a flow diagram of a process for obfuscating challenge code, according to some embodiments.

FIG. 6 is a flow diagram of a process for obfuscating challenge code, according to some embodiments. In one embodiment, the process is implemented by a computing device (e.g., that implements a challenge code obfuscator component 140). The process may be implemented using hardware, software, firmware, or any combination thereof.

The operations in the flow diagram are described with reference to the exemplary embodiments of the other diagrams. However, it should be understood that the operations of the flow diagram can be performed by embodiments of the invention other than those discussed with reference to these other diagrams, and the embodiments of the invention discussed with reference these other diagrams can perform operations different than those discussed with reference to the flow diagram.

Similarly, while the flow diagram shows a particular order of operations performed by certain embodiments, it should be understood that such order is provided by way of example only (e.g., alternative embodiments may perform the operations in a different order, combine certain operations, overlap certain operations, etc.).

At block 610, the computing device obtains challenge code for interrogating a client. In one embodiment, the interrogation includes obtaining information about the client, wherein the information is to be sent as output to a bot detection server for analysis. In one embodiment, the challenge code is obtained based on converting (e.g., transpiling) a symbolic representation of the challenge code into JavaScript (or other programming/scripting language).

At block 620, the computing device inserts, into the challenge code, code for obfuscating outputs that are to be generated by the client, where the code for obfuscating the outputs includes code for applying a first chain of reversible transformations to the outputs using client-generated random values. In one embodiment, the first chain of reversible transformations includes one or more of: string reversal, interspersion of random characters in predefined locations, XOR encryption, and nibble swapping. In one embodiment, the client-generated random values are to be determined (by the client) using a client-generated random seed. In one embodiment, the client is to send the client-generated random seed to a bot detection server, where the bot detection server uses the random seed generated by the client to deobfuscate the obfuscated outputs. In one embodiment, the bot detection server is to determine that a violation occurred if the bot detection server determines that the client-generated random seed has been previously used by the client.

At block 630, the computing device interns strings appearing in the challenge code with obfuscated strings. In one embodiment, the obfuscated strings are generated based on applying a second chain of reversible transformations to the strings appearing in the challenge code, where the second chain of reversible transformations is determined by a timestamp and a random seed generated by the computing device. In one embodiment, the second chain of reversible transformations includes one or more of: string reversal, interspersion of random characters in predefined locations, XOR encryption, and nibble swapping.

At block 640, the computing device inserts code for deobfuscating the obfuscated strings into the challenge code (e.g., code for applying the second chain of reversible transformations in reverse order).

At block 650, the computing device inlines function calls in the challenge code.

At block 660, the computing device removes function definitions that are unused in the challenge code due to the inlining.

At block 670, the computing device reorders the challenge code without changing the functionality of the challenge code.

At block 680, the computing device provides the challenge code for execution by the client.

In one embodiment, the computing device periodically generates challenge codes (e.g., every five minutes), wherein all of the challenge codes have the same functionality but obfuscate strings and outputs differently.

While embodiments are described herein primarily in the context of obfuscating challenge code, the techniques described herein can be extended/applied to obfuscate other types of code.

As mentioned above, a symbolic representation of code may help with procedurally generating challenge code. In one embodiment, a custom language is developed for the symbolic representation of code. An example of a custom language, which is referred to herein as "Morpheme," is described herein below. The Morpheme language is loosely based on Scheme, and an attempt has been made to stick to the philosophy of a simple Lisp dialect (closer to a Lisp representation of JavaScript than it is to proper Lisp). Examples of Morpheme code are provided below. It should be understood that Morpheme is provided as just one example language that can be used to symbolically represent code. It should be understood that other languages (existing languages or other custom languages) can be used as well.

Below is example Morpheme code for declarations and assignments.

```
Declarations and assignment
(define a (+ 1 2)) ; declare a
(= a 3) ; assign the value 3 to aFunctions
(defun add (a b)
    (define c (* 2 a))
    (+ c b)
)
(add 1 2) ; call add
```

Standard functions may be declared using defun. They may be restricted to a single return value, which is the last expression of the function, and may not be allowed to call themselves recursively. This may be to make inlining easier.

Objects, Arrays and member access. Morpheme may support array literals which can contain any expression. For example:
(define arr (array 1 2 3))

Objects can be created. The member access operator "." can be used to access and assign to an object. For example:
(define obj (object))
(=(. obj "foo") "a")
(=(. obj "bar") "b")
This corresponds to:
let obj={ };
obj["foo"]="a";
obj["bar"]="a";

The member access operator can be chained. For example:
(define userAgent (. window "navigator" "userAgent"))
This is equivalent to:
let userAgent=window["navigator"]["userAgent"];

The member access operator may also be used to index arrays, as it compiles to JavaScript bracket syntax, as seen above.

Lambda functions are allowed to call themselves recursively, unlike functions declared using defun. They may also implicitly return the last value. For example:
(define func (lambda (a b) (+a b)))
(func 1 2)
This is equivalent to:
let func=(a,b)=>return a+b; 1;
func(1,2);

Methods may be called by combining member access with a function call. For example:
((. window "location" "replace") "https://www.google.com")

This corresponds to:

window.location.replace("https://www.google.com");

The standard conditional may be the switch case statement. For example:

```
(define a 1)
(switch
    (case (== a 1)
        ((. console "log") "first")
    )
)(switch
    (case (== a 1)
        ((. console "log") "first")
    )
    (case (== a 2)
        ((. console "log") "second")
    )
)(switch
    (case (== a 1)
        ((. console "log") "first")
    )
    (case (== a 2)
        ((. console "log") "second")
    )
    (else
        ((. console "log") "other")
    )
)
This is equivalent to:
let a = 1;
if (a === 1) {
    console["log"]("first");
}if (a=== 1) {
    console["log"]("first");
} else if (a === 2) {
    console["log"]("second");
}if (a === 1) {
    console["log"]("first");
} else if (a === 2) {
    console["log"]("second");
} else {
    console["log"]("other");
}For-of loops
```

Morpheme may support iteration over arrays. For example:

```
(define test (array "foo" "bar" "baz" "quux"))
(for it test
    ((. console "log") it)
)
```

This may compile to a standard for-let-of loop in JavaScript, or possible something semantically equivalent for backwards compatibility with ECMA Script (e.g., ES3).

```
let test = ["foo","bar","baz","quux"];
for (let it of test) {
    console["log"](it);
}
```

While loops may also be supported. For example:

```
(while (< i length)
    ((. console "log") i)
    (= i (+ i 1))
)
```

Try-catch-statements may be supported. For example:

```
(try
    ((. window "non__existing"))
    (catch e
        ((. console "log") (+ "exception thrown (expected): " e))
    )
)
```

Morpheme may support "if" expressions which corresponds to a JavaScript ternary. For example:

```
(defun test (a b)
    (if (> a b) 1 -1)
)
```

The emitted JavaScript is:

```
function test(a, b) {
    return a > b ? 1 : -1;
}
```

The following unary operators may be supported:

```
new, i.e. ((new Date) 123) is equivalent to new Date(123)
- for arithmetical negation
not for logical negation
~ for bitwise negation
Morpheme includes these binary operators:
and - logical and (short circuiting)
or - logical or (short circuiting)
== - equivalence, emitted as strict equality (===) in javascript
!= - not equal, emitted as strict inequality (!==) in javascript
> - greater than
>= - greater than or equals
< - lower than
<= - lower than or equals
& - bitwise and (non-short circuiting)
| - bitwise or (non-short circuiting)
^ - bitwise xor
+ - addition
- - subtraction
* - multiplication
/ - division
% - modulos
>> - bitwise shift right
<< - bitwise shift left
The following special identifiers are supported:
null
undefined
true
false
```

Figure 7:
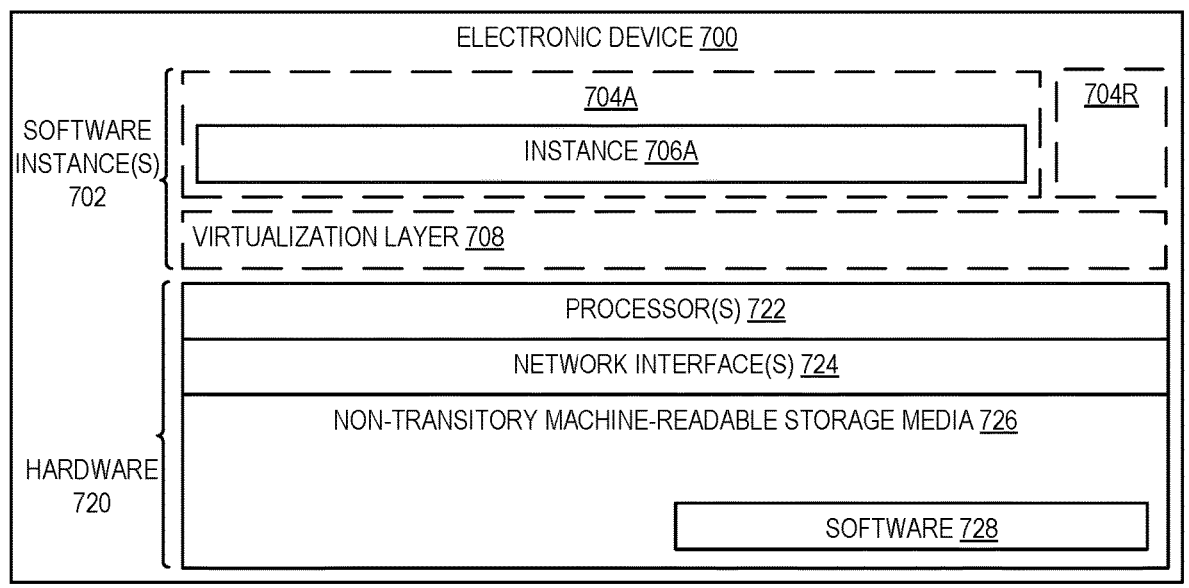
FIG. 7 is a block diagram illustrating an electronic device, according to some embodiments.

FIG. 7 is a block diagram illustrating an electronic device, according to some embodiments. FIG. 7 illustrates hardware 720 comprising a set of one or more processor(s) 722, a set of one or more network interfaces 724 (wireless and/or wired), and non-transitory machine-readable storage medium/media 726 having stored therein software 728 (which includes instructions executable by the set of one or more processor(s) 722). Software 728 can include code, which when executed by hardware 720, causes the electronic device 700 to perform operations of one or more embodiments described herein (e.g., operations for generating obfuscated challenge scripts).

In electronic devices that use compute virtualization, the set of one or more processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended embodiments/claims. The description is thus to be regarded as illustrative instead of limiting.

What is claimed is:

1. A method by one or more computing devices for obfuscating challenge code, the method comprising:
   obtain challenge code for interrogating a client;
   inserting, into the challenge code, code for obfuscating outputs that are to be generated by the client, wherein the outputs include interrogation results that are to be sent to a remote bot detection server for analysis, wherein the code for obfuscating the outputs includes code for applying a first chain of reversible transformations to the outputs using client-generated random values;
   interning strings appearing in the challenge code with obfuscated strings;
   inserting code for deobfuscating the obfuscated strings into the challenge code;
   inlining function calls in the challenge code;
   removing function calls in the challenge code;
   removing function definitions that are unused in the challenge code due to the inlining;
   reordering the challenge code without changing the functionality of the challenge code; and
   providing the challenge code for execution by the client.

2. The method of claim 1, wherein the obfuscated strings are generated based on applying a second chain of reversible transformations to the strings appearing in the challenge code, wherein the second chain of reversible transformations is determined by a timestamp and a random seed generated by the computing device.

3. The method of claim 2, wherein the second chain of reversible transformations includes one or more of: string reversal, interspersion of random characters in predefined locations, XOR encryption, and nibble swapping.

4. The method of claim 1, further comprising:
   periodically generating challenge codes, wherein all of the challenge codes have the same functionality but obfuscate strings and outputs differently.

5. The method of claim 1, wherein the client-generated random values are to be determined using a client-generated random seed.

6. The method of claim 5, wherein the client is to send the client-generated random seed to the remote bot detection server, wherein the remote bot detection server uses the random seed generated by the client to deobfuscate the obfuscated outputs.

7. The method of claim 6, wherein the remote bot detection server is to determine that a violation occurred if the remote bot detection server determines that the client-generated random seed has been previously used by the client.

8. The method of claim 1, wherein the challenge code is obtained based on converting a symbolic representation of the challenge code into JavaScript.

9. The method of claim 1, wherein the interrogation results include information about the client that was gathered based on interrogating the client.

10. A computing device configured to obfuscate challenge code, the computing device comprising:
one or more processors; and
a non-transitory machine-readable storage medium having instructions stored therein, which when executed by the one or more processors, causes the computing device to:
obtain challenge code for interrogating a client;
insert, in the challenge code, code for obfuscating outputs that are to be generated by the client, wherein the outputs include interrogation results that are to be sent to a remote bot detection server for analysis, wherein the code for obfuscating the outputs includes code for applying a first chain of reversible transformations on the outputs using client-generated random values;
intern strings appearing in the challenge code with obfuscated strings;
insert code for deobfuscating the obfuscated strings into the challenge code;
inline function calls in the challenge code;
remove function definitions that are unused in the challenge code due to the inlining;
reorder the challenge code without changing the functionality of the challenge code; and
provide the challenge code for execution by the client.

11. The computing device of claim 10, wherein the obfuscated strings are generated based on applying a second chain of reversible transformations to the strings appearing in the challenge code, wherein the second chain of reversible transformations is determined by a timestamp and a random seed generated by the computing device.

12. The computing device of claim 11, wherein the second chain of reversible transformations includes one or more of: string reversal, interspersion of random characters in predefined locations, XOR encryption, and nibble swapping.

13. The computing device of claim 10, wherein the instructions, when executed by the one or more processors, further causes the computing device to:
periodically generating challenge codes, wherein all of the challenge codes have the same functionality but obfuscate strings and outputs differently.

14. The computing device of claim 10, wherein the client-generated random values are to be determined using a client-generated random seed.

15. A non-transitory machine-readable storage medium that provides instructions that, if executed by a processor of a computing device, will cause said computing device to perform operations for obfuscating challenge code, the operations comprising:
obtaining challenge code for interrogating a client;
inserting, in the challenge code, code for obfuscating outputs that are to be generated by the client, wherein the outputs include interrogation results that are to be sent to a remote bot detection server for analysis, wherein the code for obfuscating the outputs includes code for applying a first chain of reversible transformations on the outputs using client-generated random values;
interning strings appearing in the challenge code with obfuscated strings;
inserting code for deobfuscating the obfuscated strings into the challenge code;
inlining function calls in the challenge code;
removing function definitions that are unused in the challenge code due to the inlining;
reordering the challenge code without changing the functionality of the challenge code; and
providing the challenge code for execution by the client.

16. The non-transitory machine-readable storage medium of claim 15, wherein the obfuscated strings are generated based on applying a second chain of reversible transformations to the strings appearing in the challenge code, wherein the second chain of reversible transformations is determined by a timestamp and a random seed generated by the computing device.

17. The non-transitory machine-readable storage medium of claim 16, wherein the second chain of reversible transformations includes one or more of: string reversal, interspersion of random characters in predefined locations, XOR encryption, and nibble swapping.

18. The non-transitory machine-readable storage medium of claim 15, wherein the client-generated random values are to be determined using a client-generated random seed.

19. The non-transitory machine-readable storage medium of claim 15, wherein the challenge code is obtained based on converting a symbolic representation of the challenge code into JavaScript.

20. The non-transitory machine-readable storage medium of claim 15, wherein the interrogation results include information about the client that was generated based on interrogation the client.

* * * * *